UNITED STATES PATENT OFFICE.

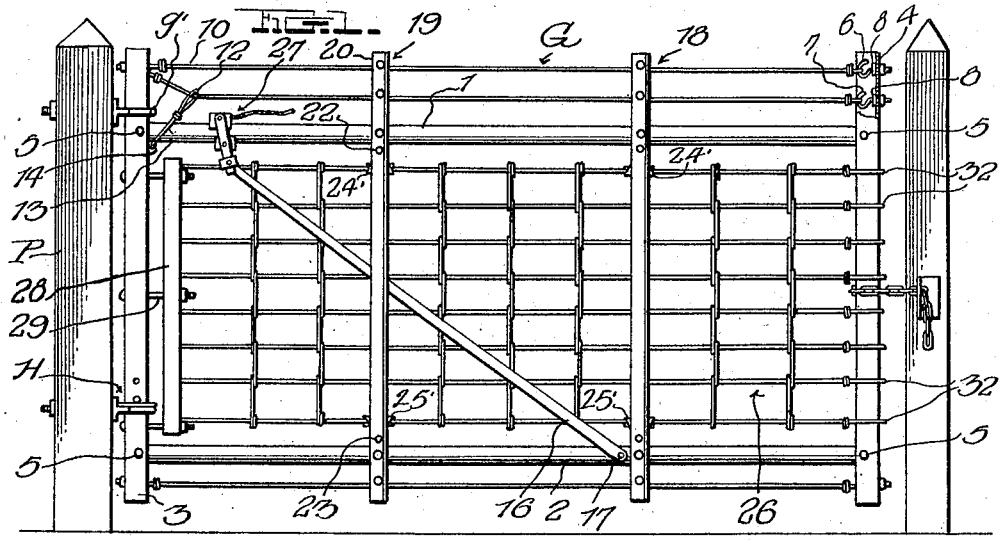
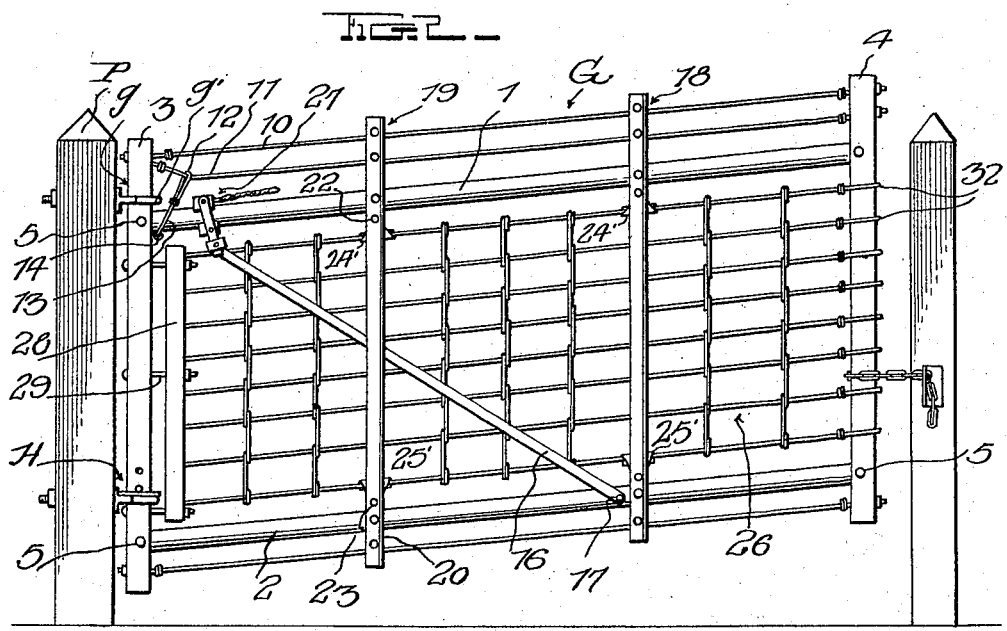

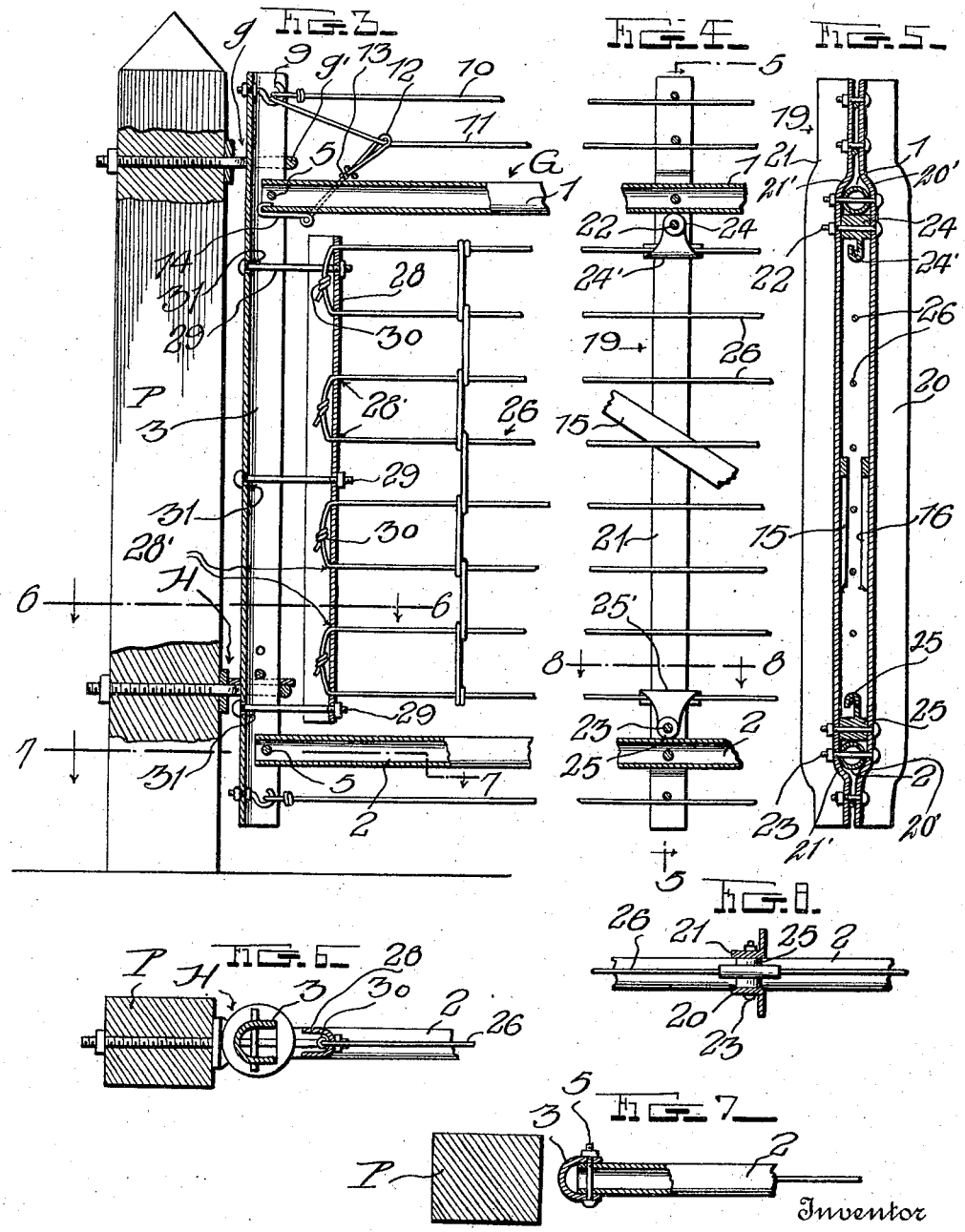

MALCOLM B. MOYER, OF MONTEVIDEO, MINNESOTA.

GATE.

1,179,133.  Specification of Letters Patent.  Patented Apr. 11, 1916.

Application filed May 6, 1915. Serial No. 26,354.

*To all whom it may concern:*

Be it known that I, MALCOLM B. MOYER, a citizen of the United States, residing at Montevideo, in the county of Chippewa and State of Minnesota, have invented certain new and useful Improvements in Gates; and I do declare the following to be a full, clear, and exact description of the invention, such as will enable others skilled in the art to which it appertains to make and use the same.

This invention relates to improvements in gates and more particularly to those which comprise a number of upright and lateral bars connected for parallelogrammatic movement.

The object of the invention is to provide a simply constructed metal gate having improved bracing means and means for connecting the woven wire covering thereto.

With this and other objects in view, the invention consists of certain novel features of construction, and the combination and arrangement of parts as will be more fully described and claimed.

In the accompanying drawings; Figure 1 represents a front elevation of a gate constructed in accordance with this invention and shown in closed position; Fig. 2 is a similar view showing the gate in partially raised position; Fig. 3 is a longitudinal section of the rear end of the gate with parts broken out for convenience in illustration; Fig. 4 is a similar view taken through the center of the gate; Fig. 5 is a vertical section taken on the line 5—5 of Fig. 4; Fig. 6 is a horizontal section taken on the line 6—6 of Fig. 3; Fig. 7 is a similar view taken on the line 7—7 of Fig. 3; Fig. 8 is a similar view taken on the line 8—8 of Fig. 4.

In the embodiment illustrated a gate G is shown composed of a pair of parallel tubular bars 1 and 2 which comprise the upper and lower rails or members of the gate and which are connected at their opposite ends by upright end bars 3 and 4, said end bars being preferably U-shaped in cross section and between the side members of which are disposed the tubular top and bottom bars 1 and 2 and which are connected therewith by bolts 5. As shown, these upright end bars 3 and 4 project above and below the top and bottom cross bars to increase the height of the gate. Mounted in the upper end of the front end bar and above the top bar 1 are two vertically spaced hook bolts 6 and 7, the shanks of which extend through the connecting cross bar or closed portion of the upright 4 and are provided with nuts on their free ends for adjustably holding these bolts in operative position, jam nuts 8 being preferably arranged on the bolts inside said bar 4 to prevent them from turning after they have been once adjusted.

A similar bolt 9 is disposed in the upright 3 at the rear of the gate with its hooked portion arranged between the flanges of said upright and which is designed for a purpose to be described. Extension wires 10 and 11 are connected at one end with the bolts 6 and 7 at the front of the gate and at their other ends are both connected with the bolt 9 at the rear of the gate, said bolt 9 being preferably arranged in alinement with the bolt at the front of the gate. A restraining or tensioning loop 12 is engaged with the lower wire 11 at its rear end before said wire is engaged with the hook 9 and said loop is provided with an encircling band 13 which passes around the tubular top bar 1 and is provided below said bar with a laterally extending hook 14, the hooked portion of which is engaged with the end of the tubular top bar 1 as shown for preventing said restraining loop from being moved on said top bar 1 beyond a predetermined point. This restraining loop 12 is designed to place the wire 11 under tension which is accomplished by twisting said loop to cause the proper strain or tension to be exerted thereby on said wire. By attaching the wires 10 and 11 over the hooked end of the bolt 9, it prevents the same from turning as it otherwise would do. This gate G is shown connected with the post P by a hinge H mounted near the lower end of said post and engaged with the upright 3, while the upper end of said upright is shown mounted in a guide $g$ which is in the form of an eye encircling the upright 3 and having a shank $g'$ extending through and connected with the post P. The hinge H at the lower end of the gate is shown so constructed as to support the entire weight of the gate at this point and has been described in detail in my co-pending application, Serial No. 23,200, filed Apr. 22, 1915. By positioning this weight supporting hinge near the lower end of the post P the greater strain on the post is placed near the ground and by so placing this hinge the downward force caused by the weight of the gate exerts its thrust against the post at the foot thereof and hence greatly reduces the strain on the post. A pair of diagonal braces 15 and 16, one being arranged on each side of the gate G and both of which are bolted at their front ends to the lower cross bar 2 of the gate at the point 17 which is disposed just one-third of the length of the bar 2, while the other ends of said bars are connected with the top bar 1 near its rear end by a suitable clamp which is constructed similarly to the clamp shown in my Patent No. 1094392. When these braces are so positioned the gate will be reliably held against sagging with the bars 1 and 2 thereof constantly held in parallel straight relation extending in planes at right angles to the uprights 3 and 4. An upright brace 18 is connected with the top and bottom bars of the gate and is here shown composed of two angle irons each arranged on each side of the gate and bolted together, said brace being disposed parallel with the front upright 4, said angle irons being bent outwardly to secure the maximum radius of gyration with a minimum weight. A similar upright brace 19 is disposed intermediately between the brace 18 and the rear upright 3 of the gate and is similar in every respect to the brace 18 and hence need not be described in detail. This brace 19, being composed of two angle irons disposed on opposite sides of the gate, performs not only the function of retaining the tubes 1 and 2 in parallel relation to transmit forces applied to the tube 1 to tube 2 and vice versa, but also serves as a restraining member for the diagonal braces 15 and 16 to prevent them from buckling outwardly and to prevent animals from getting their feet between said diagonal braces 15 and 16.

As shown in Fig. 5 the rear brace 19 is composed of two pieces of angle steel 20 and 21 having their ends offset inwardly from the body portions thereof forming shoulders 20' and 21' contacting with the tubular top and bottom cross bars 1 and 2 which are disposed adjacent the ends of said brace 19 and which have bolts 22 and 23 extending through spacing elements 24 and 25 and whose functions are to simultaneously restrain the tubular cross bars 1 and 2 and hold them at the ends of the brace 19 and also to hold the woven wire mesh 26 taut between the tubes 1 and 2, said members 24 and 25 being provided with hooks 24' and 25' for engaging the top and bottom wires of the filling mesh 26' to be described.

From the above description, it will be obvious that the space between the braces 20 and 21 of the brace 19 is sufficient to permit the passage therethrough with clearance of both of the diagonal braces 15 and 16. The clutch or clamp 27 which connects the upper end of the braces 15 and 16 with the cross bar 1 and which is constructed as above set forth in a manner similar to the clamp shown in my Patent 1094392 permits the lifting of the gate and its front end to provide for its passing over objects beneath or to permit the passage thereunder of small animals and poultry as may be desired.

The woven wire fabric 26 which fills the space between the end and top and bottom bars of the gate is here shown connected at one end to a stretcher bar 28 which may be of any desired construction but is here shown in the form of a piece of heavy angle steel U-shaped in cross section, so punched that the bolts 29 which secure said bar to the rear end member of the gate may pass therethrough and which permits the ends of the wire mesh also to be passed through spaced apertures 28' therein, there being eight strands of wire shown in the mesh here illustrated and which are passed through the stretcher bar 28 and linked together on the rear face of said bar as shown at 30 in Fig. 3. This construction provides for a low cost in assembling, and also protects the ends of the wires from injury.

The bolts 29, three of which are here shown are passed through enlarged openings 31 in the rear or cross bar of the upright 3, said openings being made larger to provide for the oscillation of these bolts when the gate is lifted and which also provides for adjustment occasioned by the expansion and contraction as well as to provide for a take-up in the mesh when the wire becomes permanently stretched.

The front end of the wire fabric 26 may be engaged with the upright 4 in any suitable manner, loops 32 being here shown passed around and engaged with said upright.

I claim as my invention:

1. The combination of a folding panel gate having upright end bars, upper and lower cross bars having their ends pivotally connected to said end bars, means for holding the gate in adjusted position, an upright brace connecting the upper and lower cross bars at a point intermediate of the length of the gate, said upright brace being composed of sections disposed on opposite sides of the gate, wire fabric stretched longitudinally of the gate, spacing elements mounted between said brace sections and between the upper and lower cross bars, each of said spacing elements comprising a body portion having an aperture, bolts passing through said apertures and the brace sections, said body portions having hooks adapted to engage the adjacent wires and hold them spaced from the adjacent cross bars and the upright brace bars.

2. The combination of a gate composed of upright end bars U-shaped in cross section, tubular upper and lower cross bars having their ends disposed in said end bars and pivotally connected therewith, diagonal brace bars connected at one end with said lower cross bar near its front end, and at their other ends with the upper cross bar near its rear end, upright braces connecting the upper and lower cross bars at points intermediately of the length of the gate, said upright braces being composed of bars disposed on opposite sides of the gate, with their ends offset inwardly forming shoulders, said shoulders contacting with said upper and lower cross bars, the body portion of said brace bars being parallel and spaced apart and disposed outside of said diagonal brace bars, spacing elements mounted between said brace bars and between the upper and lower cross bars, a stretch of wire fabric connected at one end to the front end bar of the gate, a stretcher bar connected with the rear end of the fabric, and bolts connecting said stretcher bar with the upright end bar of the gate.

3. A gate composed of vertically spaced tubular upper and lower cross bars, end uprights connecting the opposite ends of said cross bars and of U-shape in cross section with the free edges of the flanges thereof extending inwardly and between which are housed the ends of the cross bars, hooked bolts mounted in the upper ends of said uprights, wires connected with said bolts, a restraining loop engaged with one of said wires near one end thereof and connected with said upper cross bar, said restraining loop having an encircling band for passage around the tubular upper cross bar, and a hook carried by said band for detachably engaging the rear end of said tubular upper cross bar.

4. The combination of a gate having upright end bars U-shaped in cross section, upper and lower cross bars having their ends disposed in said upright bars and pivotally connected therewith, a stretch of wire fabric secured to the front upright end bar of the gate, a stretcher bar U-shaped in cross section having its channel opposite the channel in the rear upright end bar and having holes in its front face through which the inner ends of the wires of said fabric are passed and twisted together, adjustment bolts securing said stretcher bar to the rear upright end bar of the gate, said stretcher bar and rear upright end bar forming a protective housing for the ends of the wires and for said bolts.

In testimony whereof I have hereunto set my hand in presence of two subscribing witnesses.

MALCOLM B. MOYER.

Witnesses:
   LLOYD G. MOYER,
   MAUD A. CONRAD.

Copies of this patent may be obtained for five cents each, by addressing the "Commissioner of Patents, Washington, D. C."